United States Patent [19]
Kucherov

[11] Patent Number: 5,632,870
[45] Date of Patent: May 27, 1997

[54] ENERGY GENERATION APPARATUS

[76] Inventor: Yan R. Kucherov, 5272 Cobble Creek Rd. #12J, Salt Lake City, Utah 84117

[21] Appl. No.: 430,088

[22] Filed: Apr. 27, 1995

Related U.S. Application Data

[63] Continuation-in-part of Ser. No. 242,572, May 13, 1994, abandoned.

[51] Int. Cl.⁶ .................... C25B 9/00; C25B 11/08; C25B 11/10; C25B 13/00
[52] U.S. Cl. .................. 204/241; 204/252; 204/266; 204/273; 204/278; 204/290 R; 204/290 F; 204/292; 204/293; 204/DIG. 4; 204/DIG. 5; 204/DIG. 9; 204/262; 204/274; 204/272
[58] Field of Search .................. 204/292, 290 R, 204/293, 263, 266, 228, 275, 274, 262, 278, 272, DIG. 4, 239, 295, 241, DIG. 9, DIG. 5, 252, 273, 290 F; 429/12, 13, 3

[56] References Cited

U.S. PATENT DOCUMENTS

| | | |
|---|---|---|
| 1,234,774 | 7/1917 | Kocourek. |
| 3,779,811 | 12/1973 | Bushnell et al. ............ 136/86 R |
| 3,905,884 | 9/1975 | Parenti, Jr. et al. ............ 204/129 |
| 3,980,053 | 9/1976 | Horvath ............................ 123/3 |
| 4,023,545 | 5/1977 | Mosher et al. .................. 123/119 |
| 4,184,931 | 1/1980 | Inoue ............................. 204/129 |
| 4,235,863 | 11/1980 | Schulten et al. ................ 423/648 |
| 4,344,831 | 8/1982 | Weber ............................ 204/228 |
| 4,511,440 | 4/1985 | Saprokhin et al. ................ 204/60 |
| 4,588,577 | 5/1986 | Cardinal ........................ 423/657 |
| 4,670,113 | 6/1987 | Lewis ............................. 204/80 |
| 4,798,661 | 1/1989 | Meyer ........................ 204/DIG. 9 |
| 4,826,581 | 5/1989 | Meyer ........................ 204/157.41 |
| 4,936,961 | 6/1990 | Meyer ......................... 204/157.5 |
| 5,089,107 | 2/1992 | Pacheco ......................... 204/228 |
| 5,244,558 | 9/1993 | Chiang ......................... 204/241 |
| 5,273,635 | 12/1993 | Gernert et al. ................. 204/241 |
| 5,346,778 | 9/1994 | Ewan et al. .................... 429/19 |
| 5,516,114 | 10/1992 | Gunneman ..................... 123/1 A |

FOREIGN PATENT DOCUMENTS

| | | | |
|---|---|---|---|
| 2810-528 | 9/1978 | Germany | 204/272 |

OTHER PUBLICATIONS

Bockris, J.O. et al., "Triggering of Heat and Sub-Surface Changes in Pd–D Systems", *Proceedings: Fourth International Conference on Cold Fusion*, EPRI, Palo Alto, California, pp. 1–1 to 1–46.; Dec. 1993.

Handel, Peter H., "Subtraction of a New Thermo-Electrochemical Effect From The Excess Heat, and the Emerging Avenues to Cold Fusion", *Proceedings: Fourth International Conference on cold Fusion*, EPRI, Palo Alto, California, pp. 7–1 to 7–8.

*Primary Examiner*—Donald R. Valentine
*Attorney, Agent, or Firm*—Paul S. Evans

[57] ABSTRACT

Electrolytic cell apparatus and methods for generating a useful energy product from a plurality of energy sources. In a preferred embodiment, hydrogen gas is produced at a cathode by transmission of electrons through a low voltage potential barrier to electron flow achieved by careful control of electrolyte constituent concentrations and surface materials on the cathode. A portion of the energy captured in the hydrogen gas is provided by heat transmitting activity of ions dissociated from water at an anode which catalytically dissociates the water and thereby transfers thermal energy from the anode to the ions and other constituents of the cell electrolyte. Thermal energy is replaced in the anode by absorption of heat from the surrounding environment.

30 Claims, 9 Drawing Sheets

ENERGY GENERATION APPARATUS

This application is a CONTINUATION-IN-PART of U.S. patent application Ser. No. 08/242,572 filed May 13, 1994, and entitled APPARATUS AND METHODS FOR A MULTIPLE-ENERGY SOURCE THERMAL PUMP, the disclosure of which is specifically incorporated herein.

BACKGROUND OF THE INVENTION

1. Field of the Invention

This invention relates to the extraction of a useful energetic product by selectively tapping energy for the energetic product from more than one energy source. More specifically, the invention relates to methods and devices which translate energy inherent in one phase or state of an energy rich medium to another medium which is separable from the first medium. For example, the catalytic reduction of a hydrogen containing liquid such as water in an electrolytic cell produces a hydrogen gas which comprises energy derived from the energy applied to a catalytic reducer from an external thermal source and from an electrical source applied to the electrodes of the cell.

2. Background Art

Increasingly large amounts of hydrogen are used in industrial processes and as propulsion fuel in space vehicles. In recent years, hydrogen is being touted as an ideal fuel for automotive and other engines. Hydrogen may also be the ultimate utility fuel, inasmuch as its combustion with oxygen produces pure water steam rather than pollutants. Even though these proposed uses of hydrogen are the subject of many technical papers, there is no widespread commercial use of hydrogen as a primary fuel.

In the book by Griffin et al., titled *The Adoption of Hydrogen as a Universal Energy Source*, it is stated: "If the appropriate technology of hydrogen fracturing from water could be brought to an economically viable state, then it would offer an energy source of immense significance for many applications with all the advantages arising from abundance of primary resource and cleanliness of use."

Since the early 1970's, efforts have been ongoing in the area of hydrogen production technology to find methods by which vehicles, planes, and boats might operate on various forms of water. To meet this need, numerous processes have been proposed for dissociating water into its elemental hydrogen and oxygen components, such as by electrolysis.

Automobiles fueled by hydrogen are known in the U.S., Europe, and Japan. While the potential excellence of hydrogen gas as an energy source has been demonstrated by superior performance in prototype uses, hydrogen is currently only considered to be available as a preprocessed fuel. Hydrogen under current investigation is either (1) pressurized, (2) liquified or (3) stored in metallic hydrides. In each case, such storage and related delivery of hydrogen has known inherent problems.

The major factor that currently precludes the use of hydrogen as an automobile or utility fuel is the cost of hydrogen fuel production using available techniques in comparison to the cost of more conventional fossil fuels. This is true even though hydrogen, by weight is three times more powerful than gasoline in terms of KJ's of energy.

Other problems relating to the use of hydrogen as a fuel include difficulties in storage and delivery. When electrically-conductive water is subjected to electrolysis in an electrolytic cell, the molecules of water dissociate into hydrogen and oxygen gases, and a fuel gas mixture including hydrogen and oxygen (and other gases formerly dissolved within the water) can be produced. According to Faraday's Law, in a regular electrolysis process, there exists an established measurable relationship between the current passed through an electrolytic cell and the chemical products of the electrolysis process. All known methods of hydrogen fuel production are subject to the limitation of Faraday's law.

There remains a need to provide a more satisfactory solution to the use of hydrogen containing liquid as a source of energy.

SUMMARY OF THE INVENTION

The present invention seeks to alleviate known problems related to the cost of extracting a useful energetic product from water by selectively tapping energy for the energetic product from more than one energy contributing source. More specifically, the invention relates to methods and devices which translate energy delivered to one phase or state of an energy rich medium (such as a liquid) to another medium (such as a gas) which is separable from the first medium. An example of such methods and devices involves catalytic dissociation at an anode of an electrolytic cell with a liquid containing hydrogen. The catalytic dissociation is followed by electrolytic production of hydrogen gas which comprises energy derived from energy communicated through the anode from an external (environmental) thermal source and from electrical energy applied to the electrolytic cell.

The apparatus and methods associated with the instant invention involve the steps of (1) absorbing thermal energy from an external environment into a cooled anode, at least a portion of which is disposed inside an electrolytic cell and which is continuously cooled by activity of the cell; (2) at an electrolyte contacting surface of the anode, dissociating water of the cell electrolyte by an endothermic catalytic process which cools the anode and produces an ion ($H_3O^+$) which migrates toward the cell cathode; (3) providing an interface between the cathode and the electrolyte which has a low voltage potential barrier to electron flow through careful control of electrolyte constituent concentrations and surface materials on the cathode; (4) disposing the cathode close to the anode to reduce required cell-driving electrical potential, while thermally isolating the cathode from the anode and; (5) at the cathode, dissociating the $H_3O^+$ ion to produce hydrogen gas which is collected from the cell. Under other conditions, energy output in the form of increased cell temperature around the cathode in combination with energy in the form of hydrogen gas production may also be used to provide a greater than unity energy output from the cell than electrical energy supplied to the cell. However, output energy is in the form of burning of hydrogen gas and thermal energy derived from the area of the cathode.

Using this apparatus and associated methods, the cost of energy production, by the carefully restricted conditions, is appreciably reduced inasmuch as a large portion of the energy stored in the evolved and collected hydrogen gas and thermal output is derived from the cell-surrounding environment. Neither the electrode material nor the agent added to the cell electrolyte are sacrificed during cell operation. The only material consumed in the process is water which is ionized, dissociated, and then recovered when the hydrogen gas product is burned. This invention represents a radical departure from methods normally associated with conventional electrolysis of water as a technique to produce hydrogen.

An important aspect of the invention is the available temperature range over which the invention may be used. For example, if nickel is used for the cell anode, the catalyzing ability of nickel is operative down to temperatures in the range of 200° K. See Bond, G. C. *Catalysis by Metals*. London, N.Y., Academic Press, 1962. Those skilled in the electrolytic cell art understand that the cathode may be cooled to some extent by means of hot electrons transferred to $H_3O^+$ ions, and the cathode is heated due to recombination of $H^1$ atoms into hydrogen gas.

Energy release which is greater than electrical energy required to operate the cell, may be partly available from the cell in the form of increased temperature of liquid near the cathode in combination with the released hydrogen gas.

In summary, during operation of the cell, the anode is intensively cooled, and the cathode is generally moderately heated. The mechanical parts of the invention comprise an electrolytic cell having (1) an anode which is an endothermic, catalytic reducer of water and which is in efficient thermal communication with the environment surrounding the cell, (2) a liquid, aqueous or hydrogen providing, electrolyte interposed between the anode and a cathode which has a low voltage potential barrier at the electrolyte interfacing surface of the cathode, (3) a cathode having an electrolyte interacting surface which is covered by a material which cooperatively exhibits the low voltage surface potential barrier relative to the electrolyte, (4) a source of a pulsed electrical voltage applied between the cathode and anode, the voltage having appropriate magnitude and frequency characteristics to overcome the low voltage potential barrier and (5) a spacer disposed within the electrolyte and interposed between the cathode and anode to raise the thermal resistance between the cathode and anode and pass ions between the electrodes while steering hydrogen gas emitted from the cathode to a hydrogen gas collector.

Accordingly, it is a primary object of the present invention to provide an aqueous electrolytic cell which operates as a thermal pump, producing hydrogen gas and thermal energy, whereby at least a portion of the energy is derived from heat inherent in an environment surrounding the cell.

Another primary object of the present invention is to provide an aqueous electrolytic cell which catalytically dissociates water into positive and negative ions while cooling the anode of the cell.

A further object of the present invention is to provide an aqueous electrolytic cell which has a low voltage potential barrier between the cell electrolyte and the cathode surface which interfaces with the electrolyte.

Additionally, it is an object of the present invention to provide an aqueous electrolytic cell which has a low electrical resistance between the anode and the cathode while having a high thermal resistance.

A further object of the present invention is to provide an electrolytic cell and highly effective electrolytic process with equivalent thermal energy yield well in excess of the amount of input electric energy consumed to operate the cell.

Another object of the present invention is to provide an electrolytic cell and a highly effective electrolytic process which pump heat available from a surrounding environment to a dissociated portion of water within the cell and which effectively transport and deliver at least a portion of that heat to hydrogen and oxygen gas produced by the cell.

A primary object of the present invention is to increase the effectiveness of cell operation by high frequency electromagnetic agitation of the catalytic features of the metal.

A major object of the present invention is to provide an electrolytic cell and a process of hydrogen production which comprises electrodes made of non-reactant, non-sacrificial metals and which derives energy in excess of voltage and current applied across the cell electrodes from thermal energy exterior to the cell itself.

A principal object of the present invention is to produce a heating unit which is powered by an electrolytic cell which produces heat in excess of electrical power input to the cell.

Additional objects and advantages of the present invention will be apparent from the description which follows, or may be teamed by the practice of the invention.

DESCRIPTION OF THE PREFERRED EMBODIMENT

In this description, the term proximal is used to indicate the segment of the device normally closest to the object of the sentence describing its position. The term distal refers to the other end. Reference is now made to the embodiments illustrated in FIGS. 1–9 wherein like numerals are used to designate like parts throughout. In places within this specification where it is preferable to indicate that parts have similar function, but not identical mechanical and material configuration, the same numerals with primes added are used to improve ease of reference.

Technical Principles and Background

Conventional approaches used in the production of hydrogen and other electrolytically produced fuels have essentially been constrained to devices and methods which have depended upon strict adherence to Faraday's Law (i.e. wherein for a given amount of electrical charge utilized to drive the electrolysis process, a fixed, predictable maximum volume of gas is expected to be generated, assuming 100% efficiency of device operation.) This limitation has almost universally led to the conclusion that heretofore known techniques for electrochemical generation of hydrogen are impractical as a method of extracting hydrogen fuel from water. This conclusion generally stands, notwithstanding the utilization of catalytic reactions known in the art, because the volume of energetic gas produced per unit of power does not justify the cost of electrical energy consumed in the conventional techniques.

As is well known in the art, dissociation of water may be catalyzed, or the efficiency of dissociation otherwise improved through the addition of various agents to the electrolyte or by applying an oscillating electric field to affect the rate of gas fracturing from the water molecule. Cathodically generated hydrogen is produced as atomic hydrogen ($H^1$) by the combination of an electron ($e^-$) furnished by the cathode and a hydrogen ion ($H^+$) furnished by the electrolyte. Hydrogen gas results from the combination of two units of atomic hydrogen ($H^1$) to form $H_2$. Since $H_2$ has limited solubility in aqueous electrolytes, it precipitates from the solution in the form of $H_2$ gas bubbles which rise to the surface of the electrolyte which may be collected as hydrogen gas.

A theoretical basis of the quantum theory of metals and thermodynamics employed in generating the conceptual basis for the invention is briefly explained hereafter.

Figure 1:
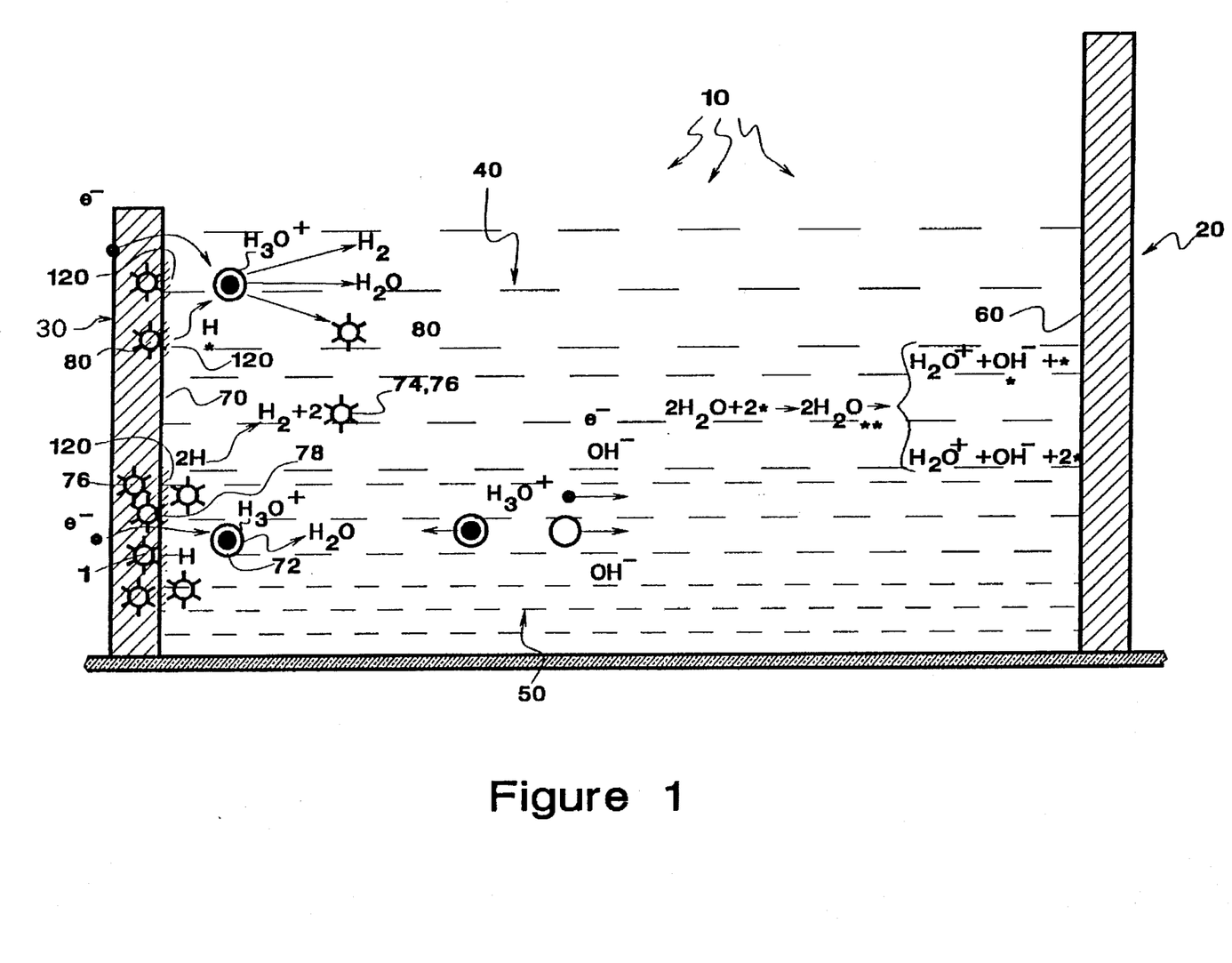
FIG. 1 is a schematic illustration of a postulated electrochemical and physical process taking place in an electrolytic cell involving an anode where catalysis is used to dissociate water and a cathode where hydrogen gas is generated.
Figure 2:
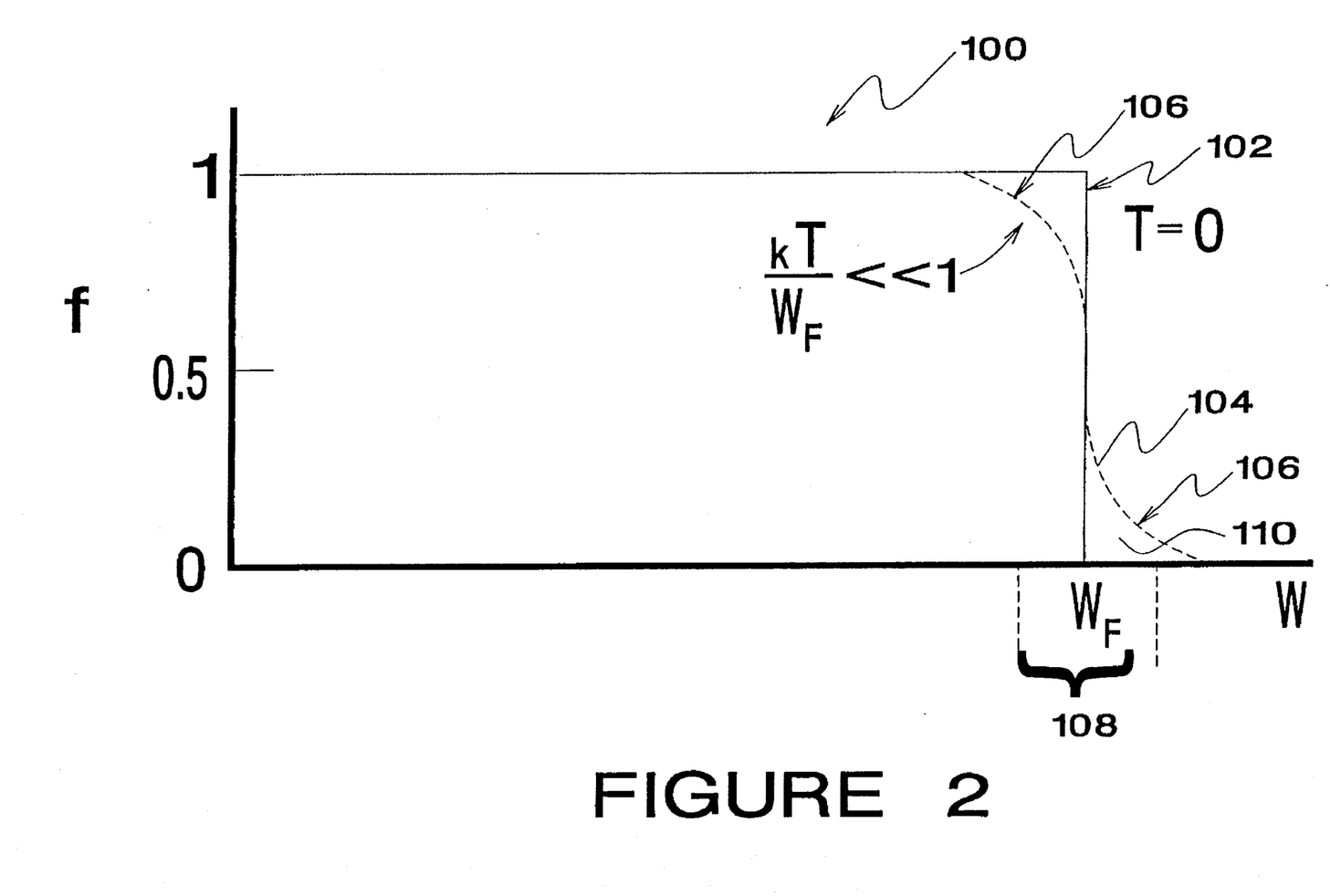
FIG. 2 is a plot of a known Fermi-Dirac distribution function, showing a graph for electron energy distribution at absolute zero (solid line) and a variation of the graph for a non-zero temperature (dashed line).
Figure 3:
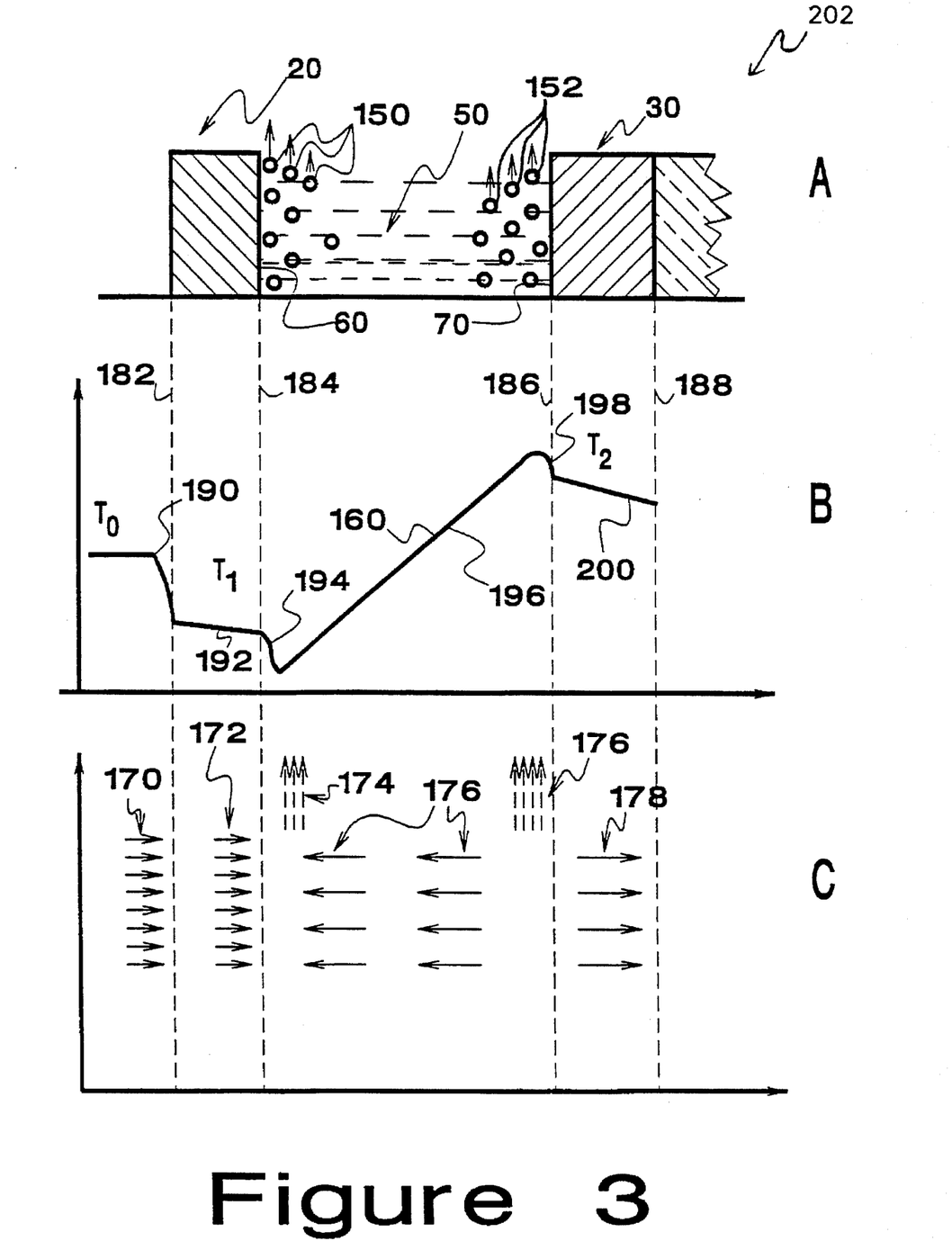
FIG. 3 is a cross-sectional view of an exemplary electrolytic cell of the instant invention comprising three parts: "A" schematically shows the relation of the electrodes to the surrounding environment and gas release; "B" is a plot of the temperature relative to space within and without the cell; and "C" illustrates the heat flow within the cell.

Operating principles of the present invention as applied to a heat pump based upon electrolytic hydrogen generation are illustrated in FIGS. 1, 2 and 3. As seen in FIG. 1, an electrolytic cell 10 comprises an anode 20, a cathode 30, and space 40 for an electrolyte 50 interposed between anode 20 and cathode 30. When operating, electric current flows from anode 20 to cathode 30 through a power source connected external to cell 10, though not seen in FIG. 1.

Water is catalytically dissociated at anode 20, forming within electrolyte 50, $H_3O^+$ ions and $OH^-$ radicals which are adsorbed on anode electrolyte contacting surface 60. Subsequent electrolytic activity dissociates the $OH^-$ radicals yielding $H_2O$ and $O_2$ (as oxygen gas), discharging electrons to anode 20 through surface 60. Oxygen gas is discharged from cell 10 as a byproduct.

At cathode 30, the $H_3O^+$ ions are dissociated through a low voltage barrier potential interface between electrolyte 50 and an electrolyte exposed surface 70 of cathode 30. Electrons are delivered to $H^+$ ions at surface 70. Resulting $H^1$ atoms collect to form $H_2$ gas which is discharged from surface 70 to be gathered from cell 10 as useful hydrogen fuel.

As all activity is assumed to take place at individual adsorption sites disposed at or upon electrode surfaces, 60 and 70, anode adsorption sites are generally denoted by (*) while cathode adsorption sites are generally denoted by (✿).

Cathodic activity

Reference is again made to FIG. 1 for a more detailed description of activity which may take place at cathode 30. The first step of the process at the cathode is the dissociation of $H_3O^+$ ions according to the equation:

(1)

As seen in Equation 1, $H_3O^+$ ions are "captured" or adsorbed at an absorption site ✿ on surface 70. Once adsorbed, donation of an electron ($e^-$) to an $H_3O^+$ ion separates $H_3^{O+}$ into $H^1$ ✿ ($H^1$ is postulated to briefly remain at an adsorption site, ✿) and $H_2O$.

This may be followed by the combination of the adsorbed hydrogen atoms:

$$2H^1 ✿ \rightarrow H_2 + 2 ✿ \quad (2)$$

or by an "electrochemical" or ion+atom reaction:

(3)

Schematically, the activity described in Equations 1–3 is seen in FIG. 1. Demonstrating the activity postulated for Equation 1, an $H_3O^+$ ion 72 is seen schematically to be adsorbed on surface 70 at ✿ 74. An electron (e) is donated to produce a hydrogen atom ($H^1$) at ✿ 74 and free one water molecule ($H_2O$).

In the case of Equation 2, one hydrogen atom is adsorbed at ✿ 76 while another hydrogen atom, in close proximity, is adsorbed at ✿ 78. The two hydrogen atoms combine into $H_2$ to precipitate from electrolyte 50 as part of a gas bubble freeing ✿'s 76 and 78 for follow-on activity.

The reaction described by Equation 3 is somewhat of a hybrid of actions depicted by Equations 1 and 2. As seen in FIG. 1, an $H_3O^+$ ion reacts with an adsorbed $H^1$ atom adsorbed at ✿ 80 to produce an $H_2$ molecule, a free water molecule and a free ✿ 80.

In order to transfer an electron from cathode 30 to a constituent of electrolyte 50, one must expend energy corresponding to the relative electron work functions of the cathode 30 material and electrolyte 50. The electron work functions for polycrystalline and single crystal metals are published in several works. See, e.g., Fomenko V. S. *Emission Properties of Materials*, 3rd ed., Naukova Dumka, Kiev, 1970; Riviere J. C. et al. *Solid State Surface*, Vol. 1, 1969, Chap. 4. Electron work functions vary in the range of 1.5–5.8 eV for major metals. Examples are provided in the following table:

| Metal | Crystal <orientation>, if Defined | Electron Work Function |
|---|---|---|
| Fe |  | 4.30 eV |
| Fe | <100> | 4.67 eV |
| Ni |  | 4.50 eV |
| Ni | <100> | 5.22 eV |
| Ni | <110> | 5.04 eV |
| Ni | <111> | 5.35 eV |
| Pd |  | 4.80 eV |
| Pd | <111> | 5.6 eV |
| Pt |  | 5.32 eV |
| Pt | <111> | 5.7 eV |
| Ir |  | 5.27 eV |
| Ir | <110> | 5.42 eV |
| Ir | <100> | 5.67 eV |
| Ir | <111> | 5.76 eV |

Quantum Statistics predict that the order of magnitude of $W_f$ in metals is about 5 eV. Measurements show that $W_f$ actually lies in the range of 5 to 8 eV for a wide range of metals.

Contrary to the well known Maxwell-Boltzmann distribution of molecular energy in gases that arises from the elementary kinetic theory of gases, distribution of electron energy states in metals is best determined using quantum statistics and can be described by a Fermi-Dirac distribution function that defines the relative number of electrons with energy between W and W+dW (per unit volume). See, e.g., Kittel, C. *Introduction to Solid State Physics*, New York, Wiley & Sons; Ziman, J. *Electrons and Phonons*, Oxford Press, 1960. Two plots, generally delineated by 100, of Fermi-Dirac distribution functions are seen in FIG. 2. Equation 4 generally describes the Fermi-Dirac distribution as a function of temperature $$f = 1/e^{(W-W_f)/kT} + 1 \quad (4)$$

where f is a distribution function equated to the probability that a given electron state is occupied, wherein:

W is electron energy;

$W_f$ is Fermi Energy;

k is the Boltzmann Constant;

T is temperature of the metal in °K.

At zero degrees Kelvin (absolute zero), electron energy level $W_f$ may be considered to be at a cut-off energy wherein all electron energy states having an energy level less than $W_f$ are completely filled and all states having an energy level greater than $W_f$ are vacant, resulting in a flat or uniform distribution curve 102. As temperature (T) increases, the distribution rounds off as demonstrated in FIG. 2 by dashed line 104, thereby producing a nonlinear distribution curve 106. A region 108 over which the distribution is affected by temperature is of the order of kT in width. States within about $\delta W = kT$ below $W_f$ are partly depopulated and states within about $\delta W = kT$ above $W_f$ are partly populated as area 110 depicts under dashed line 106 above $W_f$.

According to solid state theory, free electrons in metals are located on Fermi surfaces with energy $\approx 5$ eV. At a temperature of absolute zero (0° K.), the energy distribution of electron gas in metals is described by the Fermi-Dirac distribution as a step function (i.e. all electrons within a metal at absolute zero degrees Kelvin (0° K.) have an energy equal to or less than $W_f$, where $W_f$ is defined to be the maximum acquirable energy of electrons at zero degrees Kelvin). Those skilled in the art of thermodynamics know that at each temperature (T) above zero degrees Kelvin, the Fermi-Dirac distribution changes over the region surrounding $W_f$ to predict the portion of the total population of the electrons within the metal which has an energy distribution greater than $W_f$.

Each electrolytic cell may be considered to comprise two conductive (usually metal) electrodes. One of the electrodes is an emitter (cathode) and the other is a collector (anode). In order to transfer an electron from the cathode to a component of an electrolyte, energy, corresponding to electron work function of the cathode material in the specific electrolyte, must be expended. Generally, it is considered easier for electrons in the tail of a Fermi-distribution (i.e. electrons having an energy greater than $W_f$ and, therefore, called "hot" electrons) to overcome the surface potential barrier related to the electron work function than electrons of lesser energy ("cold" electrons), which make up the rest of the Fermi-distribution.

The removal of "hot" electrons moderately cools the cathode or anode. In the second case, removal of "cold" electrons moderately heats the cathode. To operate continuously, at least a minimal electric current must be circulated through the electrolytic cell to prevent inappropriate accumulation of electric charge on the surface of the cathode, which can otherwise block the free passage of electrons.

It is understood that electrons having sufficiently high energy states to be disposed in the tail (area 110) of a Fermi-Dirac distribution are called "hot" electrons and have the ability to overcome surface potential barrier related to electron work function more readily than electrons having energy states less than $W_f$.

The magnitude of a surface potential barrier between surface 70 and electrolyte 50 depends upon the relation between the chemical potentials of the electrode material and the electrolyte and various impurities on the interface. Generally, the higher the electron work function of the metal in the electrode and the lower the electron work function of the electrolyte, the closer the chemical potentials of the metal and adjacent electrolyte are to being equal. When the electron work functions are close to the same value, the surface potential barrier is significantly lowered on the metal-electrolyte interface (such as at surface 70 and electrolyte 50). In such a case, the energy of the electrons that manage to overcome the surface potential barrier (of surface 70) is slightly higher than the mean thermal energy of electrons in the electrode (cathode 30). Therefore, the occasion of "hot" electrons leaving cathode 30 results in a slight cooling of cathode 30. One may estimate the energetic effect of this process on the overall cell efficiency. One water molecule production is responsible for −2.5 eV and the consumption of three electrons in the electrolytic processes. Assuming that "hot" electron energy is approximately 3 kT above $W_f$, such a reaction may produce approximately 0.22 eV at normal temperatures.

However, in electrolysis, the temperature of electrons leaving cathode 30 affect cathodic temperature. In electrolysis, another competing effect is that ionic mobility within electrolyte 50 distributes electron-deficient, but potentially energy rich hydrogen ions to surface 70. At surface 70, hydrogen ions recombine as hydrogen atoms by capturing "hot" electrons emerging from cathode 30. While the release of "hot" electrons moderately cools cathode 30, the consequence of a recombining of hydrogen atoms likely entails an energy release primarily upon surface 70. Consequently, at least a portion of the recombination energy is postulated to be transferred back into cathode 30. As the energy of recombination is much higher than the residual energy of the "hot" electrons after having overcome the surface potential barrier, the total process results in heating of the cathode. Interestingly, a higher temperature of the cathode yields a greater number of "hot" electrons in the Fermi-Dirac distribution area 110, which are more capable of overcoming the potential barrier of surface 70, thereby intensifying the rate at which electrons emerge into the electrolyte and the rate of hydrogen gas formation if cathode recombination is a reaction rate limiting process.

In order to facilitate the emission of electrons from surface 70, it is highly desirable to effectively reduce the potential barrier at surface 70. To accomplish this, a specific agent is used to cover surface 70. The agent may be added to cathode 30 while disposed in cell 10. Preferably, the agent is added to surface 70 from electrolyte 50 into which the agent has been previously dissolved as a metallic salt. Such agents comprise metallic ions from a group of metals comprising Cs, Rb, or K and other elements which are characterized by a relatively low valued electron work function. Metals having low valued work functions are adsorbed on surface 70 and cover materials of higher work functions (such as stainless steel or stainless steel coated with oriented single crystal nickel). Disposing a low work function metal on surface 70 of cathode 30, such as at sites 120, effectively reduces the surface work function and the resulting potential barrier between surface 70 and electrolyte 50.

Such agents are generally added in excess of an amount required to cover surface 70. Because such agents are easily ionizable, the associated salt anions increase the desirable electrolyte conductivity, even in small concentrations. The dependence is not direct because Cs, being heavy, has the lowest work function and the worst ion mobility in this group. Any reasonable increase in conductivity is important in improving the efficiency of cell 10 operation by reducing ohmic losses during the electrolysis process. The reduction of cell 10 resistance decreases the necessary level of external power required to run a predetermined level of electrolytic activity.

Anodic activity

Referring again to FIG. 1, anode 20 is preferably made of a metal with the ability to catalytically dissociate water, e.g. Ni, Pt, Ir, Platinum-nickel alloys, noble metals, nickel-stainless steel, or Pd F.C.C. single crystal with <111> crystallographic orientation, or other non-corrosive high electron work function metals like Re or W, and alloys thereof. A key to the operation of the instant invention as a thermal pump is that water molecules undergoing catalytic dissociation are endothermic and consume energy from the catalyst. Further, to maintain a thermal conducting process from anode 20 to ions within electrolyte 50, the thermal conductivity of anode 20 is much greater than the associated thermal conductivity of electrolyte 50. A major causal process which is considered to determine a temperature change within anode 20 is expenditure of internal anode 20 heat during water dissociation.

It is assumed that each catalytic agent has a plurality of catalysis sites, generally denoted by "*". At anode 20, water molecules may dissociate as described in the following equations:

$$2H_2O** \rightarrow H_3O^+ + OH^- * + * \qquad (5)$$

or $$2H_2O** \rightarrow H_3O^+ + OH^- + 2* \qquad (6)$$

Equations 5 and 6 postulate the use of two catalysis sites for generation of each pair of $H_3O$ and $OH^-$ ions. Equation 5 postulates the continued attachment of an $OH^-$ ion to one catalysis site following dissociation. Equation 6 postulates the separation of all ions from catalysis sites following dissociation. Other activity may catalytically generate a small amount of hydrogen gas but for the most part, reduces hydroxide ions to produce water and oxygen as described by the following equation:

$$4OH^{-*} \rightleftharpoons O_2 + 2H_2O* + 4e^- + 2* \qquad (7)$$

It is likely that some exothermic processes of ion recombination take place on surface 60 of the anode 20. However, any exothermic energy release is not considered to be large compared to the endothermic processes of catalysis which also occur on surface 60. Further, some endothermic heat is likely dissipated by oxygen and any other gases bubbling up from surface 60. The combined resulting effect of catalytic, electrolytic and other activity at surface 60 is the cooling of anode 20, which is compensated for by absorption of heat from the environment in efficient thermal communication with anode 20 and partially from the cathode and the electrolyte by thermal conductivity.

Surface 60 adsorption of non-aqueous materials, comprising metals and other impurities which may be found in electrolyte 50, may decrease catalytic activity. Care should be taken to assure that a large portion of surface 60 is available for catalysis. Generally, a small amount of an ionizable additive, which should correspond to the maximum conductivity of electrolyte 50, will preserve a high catalyzing ability of anode 20. A hydroxide is the preferred ionizable additive.

As a result of the anodic and cathodic activity described above, anode 20 is continuously cooled during operation of cell 10, while cathode 30 is heated. Therefore, more energy is released in the cell than is dissipated in electrical power supplied to cell 10 by adjusting the potential barrier of surface 70 such that a low voltage operates cell 10 and passing a relatively low current from an external power source through cell 10, while assuring adequate heat exchange between the environment and anode 20. The excess energy of the cell is derived from heat absorbed from the surrounding environment which is generally warmer than anode 20.

It should be noted that thermodynamic analysis of a closed system does not predict more energy emitted from the cell than is provided by electrical power delivered to an electrolytic cell. Taking advantage of endothermic cooling of anode 20, resultant heating of cathode 30 and the discharge from cell 10 of an energy rich gas from a phase change, allows the instant invention to operate as an excess energy generating heat pump.

For cell 10 to operate effectively, cathode 30 must be thermally isolated from the environment and anode 20 must be in efficient thermal communication with the environment.

For increased operational efficiency, it is recommended that care be taken to include the following features in the design of cell 10:

1. An ion permeable membrane interposed between anode 20 and cathode 30 to reduce convective and other retrograde heat flow from cathode 30 to anode 20.

2. A relatively small gap between anode 20 and cathode 30 to reduce the ohmic losses to as little as possible. Such a gap should not be smaller than two electron screening radii (Debye radii) in electrolyte 50 space, otherwise normal cell operation will be ruined. A fundamental property of the counterion distribution is the thickness of the ion atmosphere, determined by the quantity (1/k) called the Debye length or Debye radius. 1/κ has the cgs dimensions of cm, so κ has dimensions $cm^{-1}$; κ is given by:

$$\kappa = \left( \frac{8\pi N_A e^2 \rho_A}{1000 \epsilon K_B T} \right)^{1/2} I^{1/2}$$

in which $\rho_A$ is the solvent density, e is the protonic charge ($4.803 \times 10^{-10}$ esu), $\epsilon$ is the solvent dielectric constant, $N_A$ is Avagadro's number, $K_B$ is Boltzmann's constant, T is temperature and I is the ionic strength.

It must be kept in mind that the gap must be large enough for liquid to reach the surface of each electrode and for gas bubbles created at each electrode surface to freely rise from the electrode. In some embodiments, the interelectrode gap may be as low as 1 micrometer.

3. Other ways to improve the catalytic ability of the electrodes include excitation of those surface plasmons responsible for chemical bonds by imposing a high frequency electromagnetic agitation signal upon the electrode. Rowe, J. E. et al. *Physical Review Letters*, vol. 31, no. 2, (July 1973), p. 102.

4. All electrode materials should be corrosion resistant.

Referring to FIG. 3, general activity of cell 10 (with only limited portions of parts of cell 10 shown in part A of FIG. 3 for clarity of presentation) is seen at anode 20 and cathode 30 with gas bubbles, generally designated 150 and 152 being produced by dissociating water. Oxygen gas bubbles 150 are generally evolved at anode 20. Hydrogen gas bubbles 152 are generally evolved at cathode 30. A heat conductive material 202 is adjacent to the cathode. A schematic representation of temperature distribution exterior to and interior to an operating cell 10 is seen as line 160 in part B of FIG. 3. A general map of heat flow comprising arrows, generally designated as 170, 172, 174, 176 and 178, is seen in part C of FIG. 3. Dashed lines 182, 184, 186 and 188 provide a common reference for dimensional relationships between items disclosed in parts A, B and C of FIG. 3.

Referring again to part B of FIG. 3, line 160 appears to comprise a number of distinct segments 190, 192, 194, 196, 198, 200. Adjoining segments are continuous. Segment 190 represents an environmental temperature external to cell 10 or at least a temperature of a thermal conductor communicating environmental temperature to cell 10. Due to the relatively high thermal conductivity of anode 20 and endothermic activity occurring thereat, segment 190 shows a significant downturn (decrease in temperature) as it becomes proximal to a communicating surface of anode 20. Segment 192 shows only a slight decrease in value as is proceeds from segment 190 to segment 194 due to the relatively high thermal conductivity of anode 20. Segment 194 is representative of anodic activity taking place at or near the surface 60 of anode 20. Segment 196 plots temperature rise between anode 20 and cathode 30. The shape of segment 196 is preferably not linear in a preferred embodiment of cell 10 due to a thermal insulator interposed between anode 20 and cathode 30, the character and use of which is discussed in detail later. Segment 198 represents a relatively small rise in temperature at the surface of cathode 30 mainly due to better thermal conductivity of metal relative to the electrolyte. Segment 200 is a relatively flat line indicating temperature within cathode 30. As seen in FIG. 3A, in some cell designs, it may be preferable to insulate portions of cathode 30 which are not actively used in heat pump operation.

Referring now to heat flow vectors 170–178 shown in FIG. 3C, as heat flow arrows 170 indicate, during the operation of cell 10 a continuous flow of thermal energy is absorbed by anode 20 from the environment. While vectors 176 indicate a significant tendency for heat flow from cathode 30 to anode 20, placement of a thermal insulator between the electrodes permits most energy to be ionically transported (via $H_3O^+$ ions) from anode 20 to cathode 30. By this means, a significant portion of that energy is transferred to hydrogen bubbles eventually evolved at surface 70 of cathode 30. The resulting overall efficiency of the cell 10 operation, in terms of the electricity consumed and energy in the form of heat and hydrogen gas evolved, may, therefore, be greater than unity.

The electrolytic cell of this instant invention may also be used as a heat pump. For dissociation of water into hydrogen and oxygen gas, a normal electrolytic cell generally consists of two metal electrodes immersed in an electrolyte. Oxygen is released at the cell anode and hydrogen is released at the cell cathode. The dissociation reaction is generally endothermic (heat is consumed) and any recombination is exothermic (heat is released). Such information is well known in the electrolytic cell art and is described in Eisenberg, D. et al. *Physical Chemistry with Applications to Life Sciences*, John Wiley, 1979. While these effects are known in the art, use of such effects in the design of a heat pump has generally eluded incorporation into an operating heat pump device.

By channeling heat flow in a cell, a heat pump can be created, wherein heat flow will be channelled from outside the cell to the anode from the cathode to an outside site. The efficiency of such a device is defined by heat loss in the cell coupled with heat loss to the outer walls of the cell. In a thermodynamics sense, if the system is closed, the cell efficiency is generally less than one. However, the system of this invention may also be considered as an open system. Elements which cause the system to be open comprise released gas and heat exchanged through the outer walls of the cell.

As endothermic anodic activity reduces anode temperature, providing a way of communicating heat derived from an environmental source exterior to the cell through a heat exchanger results in heating of the anode and thereby adding external energy to the cell. Such added energy provides an opportunity to run a cell at efficiencies greater than 100% when measured relative to electrical input energy. Appropriately designed, such operation of a cell appears to violate the second law of thermodynamics.

The second law of thermodynamics is not violated because a cell absorbing energy from an environment outside the cell is not a closed system. If the cell were enclosed in an insulated housing, the second law would be observed, and the thermal efficiency would be below unity.

Following is a summary of considerations for maximizing efficiency of a hydrogen gas electrolytic cell generating excess energy. Anode 20 should be a metal having a very high water dissociation catalyzing ability, e.g. Ni, Pt, or Pd single crystal with <111> orientation. As low a current through cell 10 as possible should be used to prevent ohmic losses. Easily ionizable additives should be introduced into water to form electrolyte 50. Such additives are preferably basic salts of K, Rb, or Cs. An external power source preferably providing pulsed power of 0.4 to 0.6 volts is recommended to run the electrolysis. Assuming that at least $\approx 0.2.5$ eV energy is released with the combustion of one $H_2$ molecule, the ratio of electrical energy consumed in the operation of cell 10 to thermal energy evolved by burning released hydrogen may be as high as high as 400–500%. This compares very favorably with an expected efficiency of a closed thermodynamic system in the range of 80–90%.

Care should be taken in the design of cell 10 to establish a low electron work function on the electrode surfaces in combination with as small of an inter-electrode gap as possible. (Theoretically a gap the size of two electron screening radiuses in the electrolyte would be preferred, however; such a small gap precludes adequate liquid flow between the electrodes and makes the thermal conductivity between electrodes too high.) Therefore, a gap of approximately 100 microns has been established as the preferred gap to reduce the voltage required to operate cell 10 to a fraction of a volt.

Figure 4:
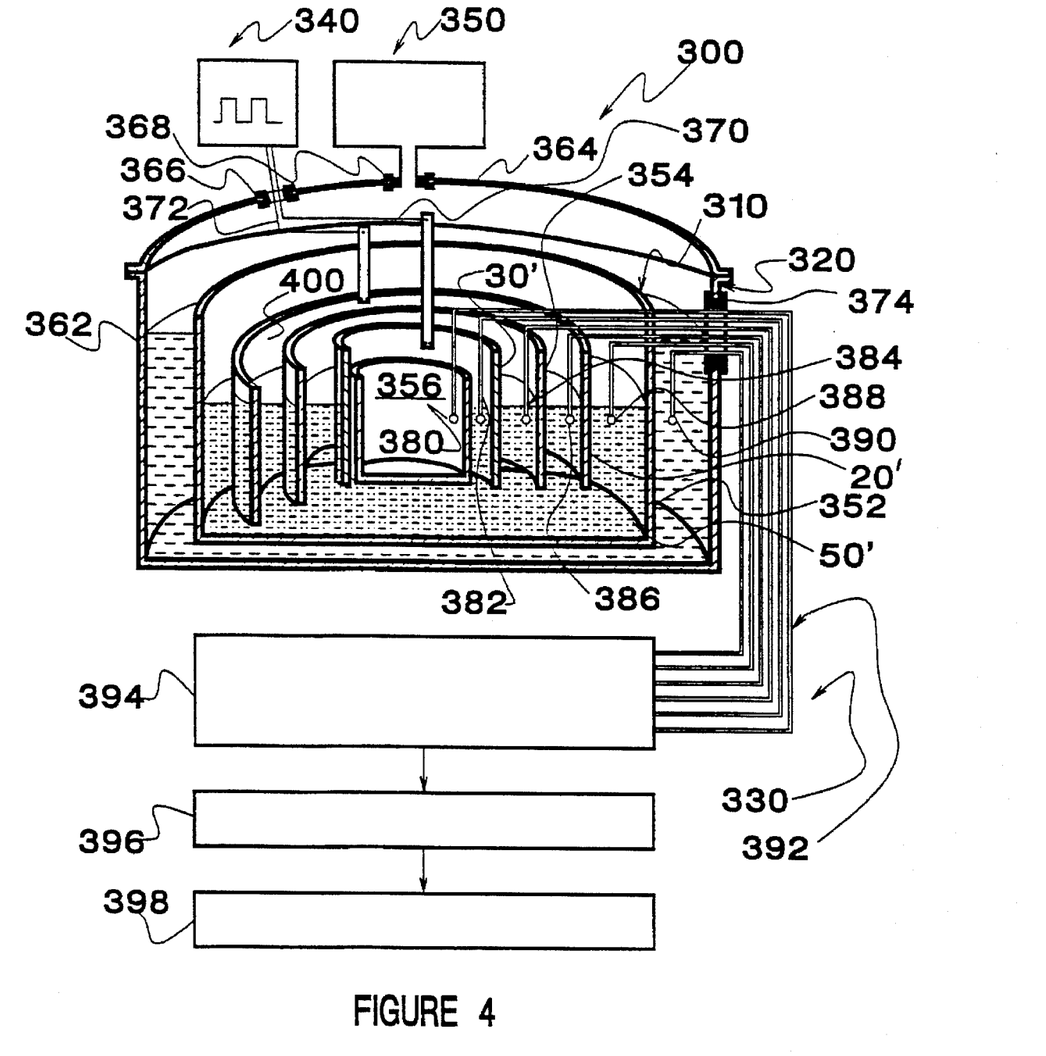
FIG. 4 is a cross-sectional view of an experimental configuration of a test cell with connecting functional blocks to represent a complete test system.

For a clearer understanding of proof of the principle of the instant invention, results of an experiment on a test model are summarized in FIGS. 4–7 and described hereafter. As seen in FIG. 4, a test system 300 comprises a test cell 310 (comprising functional parts similar to cell 10), a container 320 for the cell 310, a temperature sensing data reduction system 330, a source of electrical power 340 and an evolved gas safety handling system 350. It should be emphasized that this apparatus was constructed expressly to evaluate general internal cell operation and was not designed as a preferred embodiment for capturing and accomplishing over unity heat transfer to a usable hydrogen gas. In this test, cell 310 comprised a large beaker 352. An anode 20' and cathode 30' were disposed within beaker 352. Interposed between anode 20' and cathode 30' was a thermal barrier material 354. A centrally disposed beaker 356 was medially disposed inside the cathode to save the amount of electrode needed for the system. An electrolyte 50' provided liquid communication between the interior of beaker 352, anode 20' and cathode 30'.

Cell 310 was medially disposed in container 320. Container 320 comprised a base part 362 which had the form of a hollow cylinder closed at the bottom and a removable top 364 which provided a gas tight seal when in place on base part 362. Top 364 comprised two sealed passage ways 366 and 368. Passage way 366 was used for delivery of electrical conductors 370 and 372 from power source 340. Passage way 368 was used for safe disposal of evolved gases at a gas collection and handling system 350. Base part 362 and top 364, when joined, formed a high pressure container.

Base part 362 also comprised a sealed passage way 374 for a plurality of leads from temperature sensors. A set of temperature sensors 380, 382, 384, 386, 388 and 390 were strategically disposed in container 320 and cell 310 to measure the temperatures in the compartments of cell 310 formed by the electrodes and other components. Conductors, generally designated 392, connected the temperature sensors to a series of thermistor bridges 394 which were connected to signal conditioning electronics 396 and to a digital processor 398.

Beaker 356 was a cylindrical vessel having an outer diameter of 120 mm. Beaker 352 was also a cylindrical vessel, but with an inner diameter of 145 mm. Both beakers 356 and 352 were approximately 115 mm in height with wall thickness of about 1.7 mm.

Anode 20' was made of a 0.2 mm thick, 100 mm wide 316 stainless steel band cut long enough to at least circle the inner circumference of beaker 352. Inner surface 400 of anode 20' was coated with a layer of platinum to a thickness of about 1000 Å. Anode 20' was disposed in close proximity to the inside surface of beaker 352 with the platinum coated surface 400 disposed toward the interior of the cell.

Cathode 30' was made of a 0.5 mm thick solid nickel 100 mm wide band stock and cut to a length which was as long as the outer circumference of beaker 356. An interelectrode gap between anode 20' and cathode 30' was about 5 mm.

To provide for thermal separation between anode 20' and cathode 30', thermal barrier 354 was placed therebetween. Barrier 354 was made the same width as anode 30', of a length to surround cathode 30' and a thickness which resulted from a double layer of 1 mm thick FIBERGLASS (glass in fibrous form).

Electrolyte 50' comprised 0.2N solution of CsOH in distilled water. The volume of the electrolyte was about 550 ml. To ensure adequate heat communication between container 320 and cell 310, space between container 320 and cell 310 the was filled with two liters of regular water. A heavy weight was placed into beaker 356 to keep it from floating.

It was noted that the electrode height was approximately 20 times the interelectrode gap. The relation between areas of anode 20' and cathode 30' was about 1.1:1.0, respectively. Such geometry suggests mostly radial heat flow in cell 310.

Figure 5:
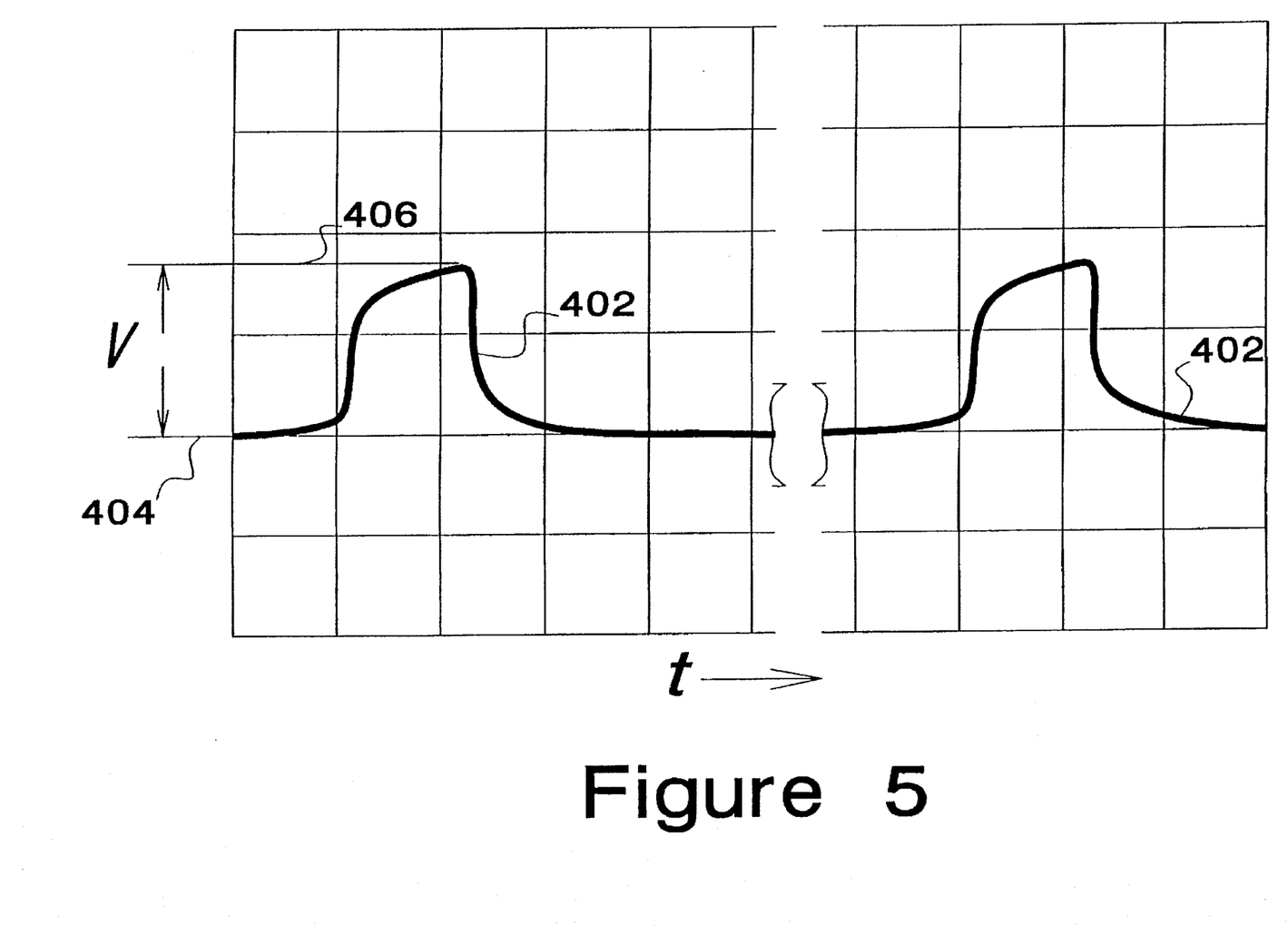
FIG. 5 is a plot of a voltage waveform.
Figure 6:
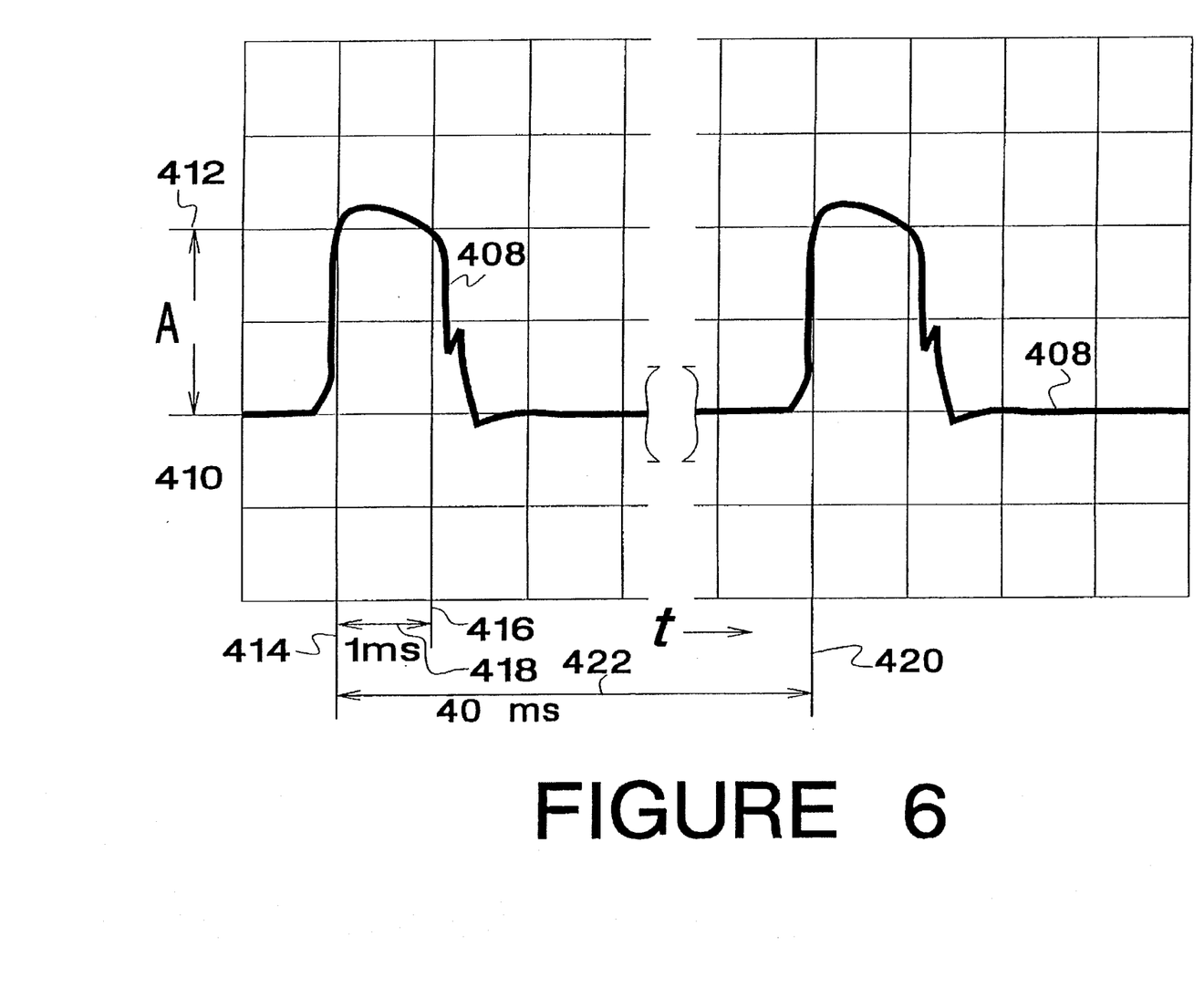
FIG. 6 is a plot of an amperage waveform associated with the voltage waveform of FIG. 5.

Cell 310 was powered from a pulsed power source, providing voltage and amperage waveforms similar to those seen in FIGS. 5 and 6, respectively. The voltage waveform is generally designated 402. Waveform 402 periodically rises from a base line, null voltage 404 to a maximum 406 in an approximate square wave pulse.

The amperage waveform, generally designated 408, rises and falls concurrently with voltage waveform 402 between minimum level 410 and maximum level 412. As may be noted by observing grid lines 414 and 416, which are separated as indicated by double arrow line 418 by 1 millisecond, the width of an exemplary pulse is about 1.2 milliseconds. Also, as may be noted by grid line 420 positioned at the rising portion of a next pulse, the pulse separation for the test, as measured by double arrow line 422, was 40 milliseconds. In the experiment from which the waveforms of FIGS. 5 and 6 were recorded, the rise time of the pulse was approximately 3 microseconds. The pulse was generated from a 4001 type Global Specialties Pulse Generator, which triggered a transistor circuit with a capacitor charge storage. A current probe in the voltage source line was made using a 0.3 ohm 10 watt resistor. While current values vary due to changes in electrolyte concentrations in the cell, the height of a typical current pulse is dependent the upon cell voltage and effective resistance. A Techtronix type 422 oscilloscope was used to determine the voltage and current values. It was estimated that the power values were accurate to ±10% (6% instrumental error).

Utilization of pulsed current electrolysis makes it possible to take advantage of the so-called effects of Winn and Falkenhagen with the manifestation of decreasing electrolyte resistivity due to high intermittent current densities and a pulsating field. These effects generally prevent accumulation of an ion retarding atmosphere in the electrolyte. For this reason, electrical conductivity in cell 310 was higher when excited by a pulsed voltage than the electrical conductivity when activated by a D.C. voltage.

Figure 7:
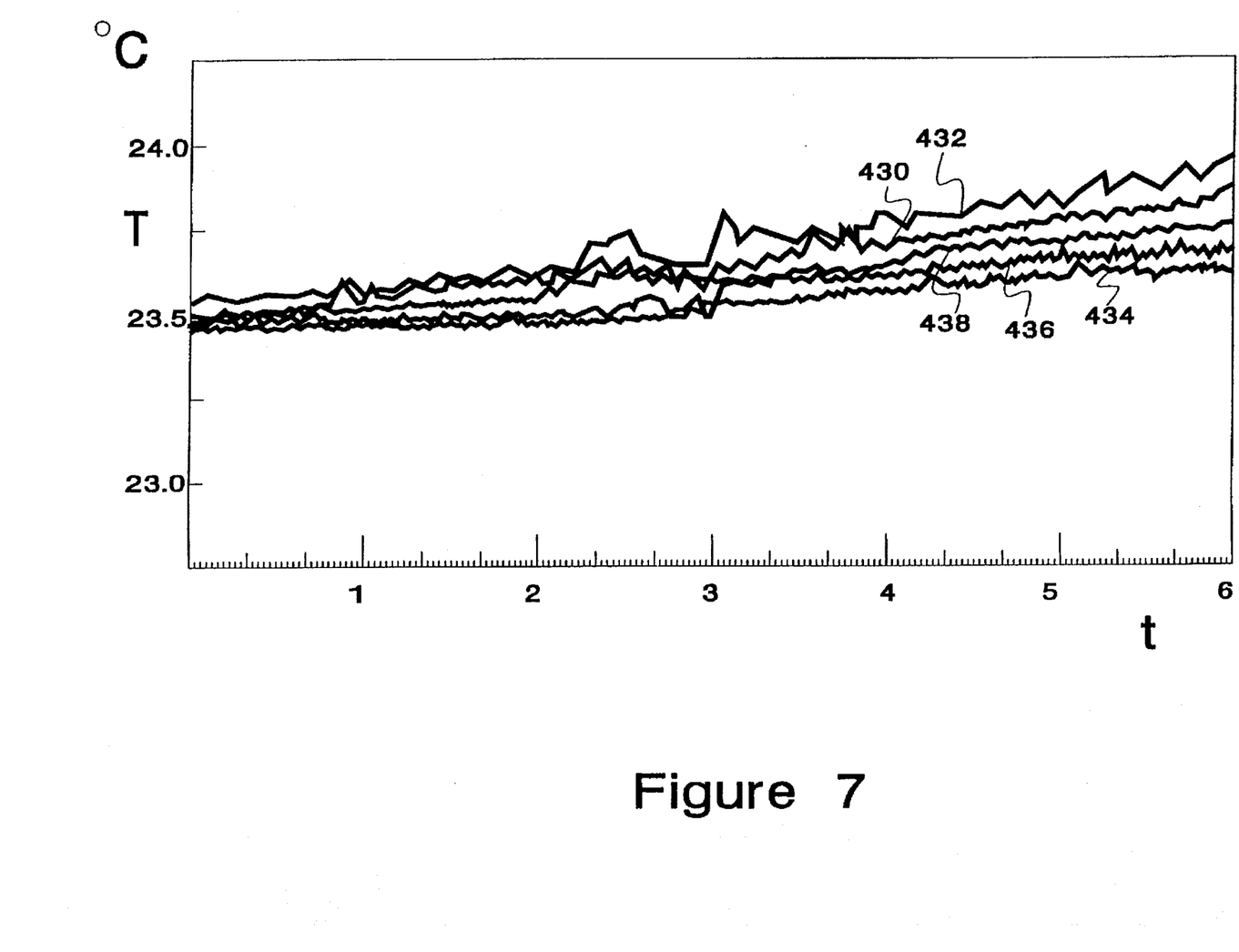
FIG. 7 is a plot of a plurality of measured temperatures derived through operation of a cell.

A plot of the measured temperatures in this test is provided in FIG. 7, with temperature (T) in °C. being plotted along the ordinate and time (t) in hours being plotted along the abscissa. Temperature measurements were made through thermistors 382–390. (Internal temperature of beaker 356 was not measured.) Five temperature traces 430, 432, 434, 436 and 438 represent temperatures measured by temperature sensors 382, 384, 386, 388 and 390, respectively. Generally, thermistors were selected to be of YSI type #44203 and were installed at the same horizontal level mid-way down in electrolyte 50'. Each thermistor was placed into a thin glass tube, partially filled with vegetable oil to provide a physical isolation and an acceptable thermal contact with the measured environment. Signals from the thermistors were directed to a set of thermistor bridges 394 and, from there, ultimately to a processor 398, as seen schematically in FIG. 4, where the measured data was reduced and displayed.

Of particular interest there is a difference in temperatures measured by thermistors 386 (trace 434) and 388 (trace 436), which is an indication of the thermal gradient through anode 20'. What is also interesting is the difference in temperatures between ambient (trace 438) and the inner surface of anode 20' (trace 434). The magnitude of heat flow from cell 310 exterior to the coldest spot in cell 310 was calculated as:

$$Q = \sigma * S * (\delta T / \delta 1)$$

where:

σ is the specific heat conductivity of the cell vessel wall (0.9 to 1.2 W/m*K);

S is the area of heat conducting surface (of anode 20') which is about $4.65*10^{-2}$ m$^2$;

δT is the temperature difference between high and low measured temperatures. At an average input power equal to 1.8 to 2.5 W, the temperature difference between the space outside cell 310 and anode 20' at the position of sensor 386 was 0.3° to 0.6° C. in different experiments;

δ1 is the wall thickness of beaker 352 (1.7 mm).

The calculated Q ranged from 7.3 to 11.4 W. Thus, the measured thermal energy is calculated to be about 300–500% of electrical input power.

Figure 8:
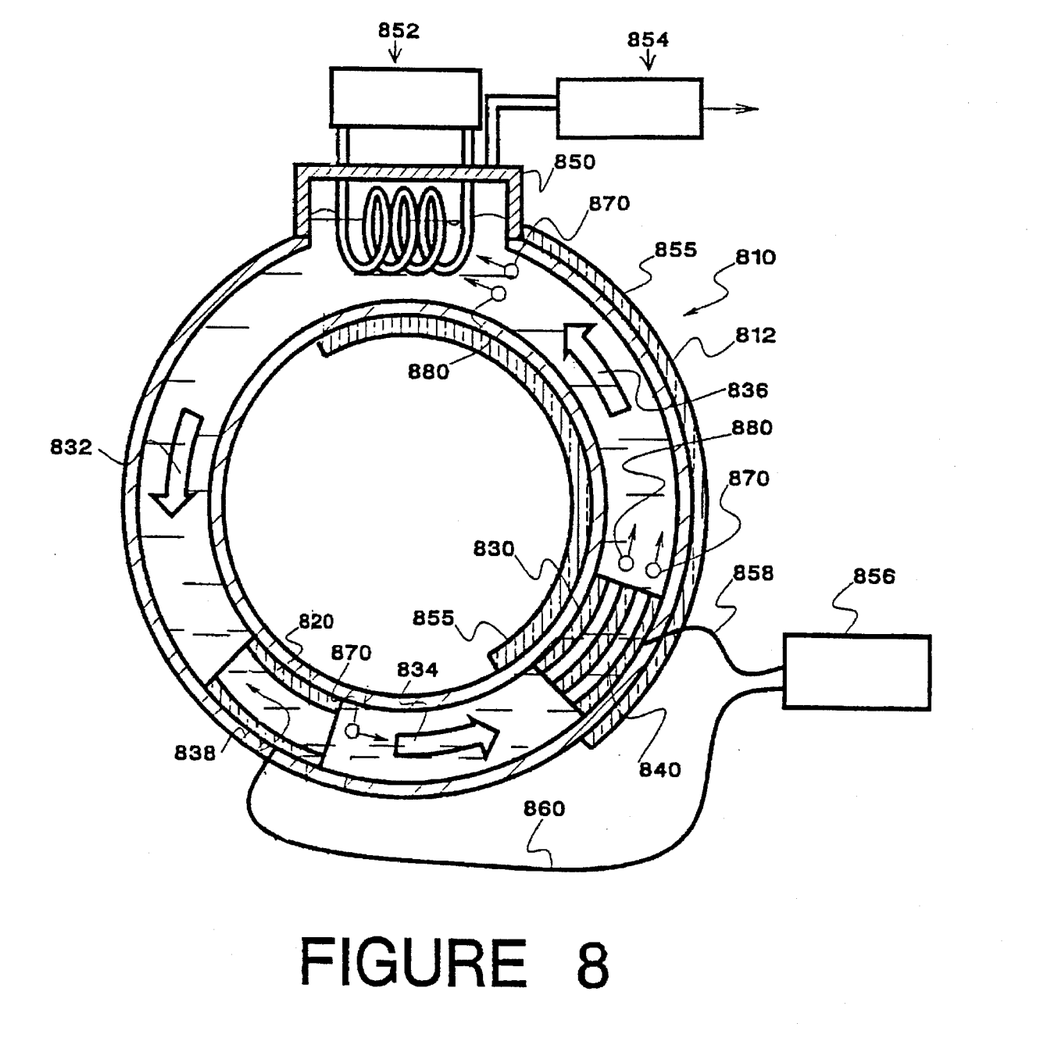
FIG. 8 is a lateral section of a cell with schematic blocks of devices associated with the cell.

In cells which derive excess energy as a combination of evolved hydrogen gas and thermal pumping of high temperature fluid to the cathode, the energy must be removed from the cell both in the form of evolved gas and through a heat exchanger. Reference is made to FIG. 8 wherein a cell 810 employs convective circulation to make liquid of a higher temperature available to a heat exchanger.

Cell 810 comprises an annular toroidal tube 812 preferably made of thermally conducting synthetic resinous material. Cell 810 comprises an anode 820 and a cathode 830, each of which comprises material characteristics similar to anodes 30, 30' and 30" and cathodes 20, 20' and 20" previously described. However, in this case, no insulating divider is used between anode 820 and cathode 830 as fluid flow through tube 812, indicated by arrows 832, 834 and 836, depict heat carrying fluid flow between anode 820 and cathode 830, while keeping back-flow of heat away from anode 820. Also, electrodes 820 and 830 comprise flow through paths 838 and 840.

Cell 810 also comprises a compartment 850 superiorly disposed at the top of toroid 812 for collecting evolved gas and providing access for heat exchange. For these purposes, a heat exchange mechanism 852 is also superiorly disposed to toroid 812. In addition, an evolved gas utilization device 854 is similarly disposed to acquire and translate energy contained in the gas into usable energy. For this reason, device 854 may comprise a fuel cell or a hydrogen gas oxidizer. Devices to fulfill the functions of mechanism 852 and device 854 are known and widely commercially available. To preserve heat generated at cathode 830, a thermal insulating sleeve 855, made of porous plastic, is disposed about tube 812 across a distance comprising cathode 830 to mechanism 852.

As earlier described for powering the electrodes of cells 10, 10' and 10", a power supply and circuits 856 which supply pulsed voltages to the cell are employed to power cell 810. Connections 858 and 860 from power supply and circuits 856 to cathode 830 and anode 820, respectively, may be provided through a wall of toroid 812 or snaked to a similar connection through an access provided (but not shown) through compartment 850.

In operation, activity within cell 810 is initiated by applying a voltage across electrodes 820 and 830. Generally, application of the voltage causes the liquid surrounding anode 820 to cool. The transport of energy containing ions and the action of ions at cathode 830 causes the liquid surrounding cathode 830 to heat. Heat so generated is retained within tube 812 by the insulation of sleeve 855. For this reason, fluid moves by convective force relative to electrodes 820 and 830 as shown by arrows 834 and 836. Also, gas generated at anode 820 (generally designated by 870) and gas generated at cathode 830 (generally designated by 880) follow the flow and upward path of toroid 812 leading to compartment 850.

At the top of toroid 812, gas is removed to device 854 and the liquid flowing passed the cooling units of mechanism 852 is cooled as heat is removed. The cooled liquid then traverses through toroid 812 as indicated by arrow 832 while being heated by interaction with the unsleeved portion of tube 812. In other embodiments of a cell in which energy is removed both in the form of gas and heated liquid, it may be preferred to use an impeller to control fluid movement. Use of such devices is within the scope of the invention.

Figure 9:
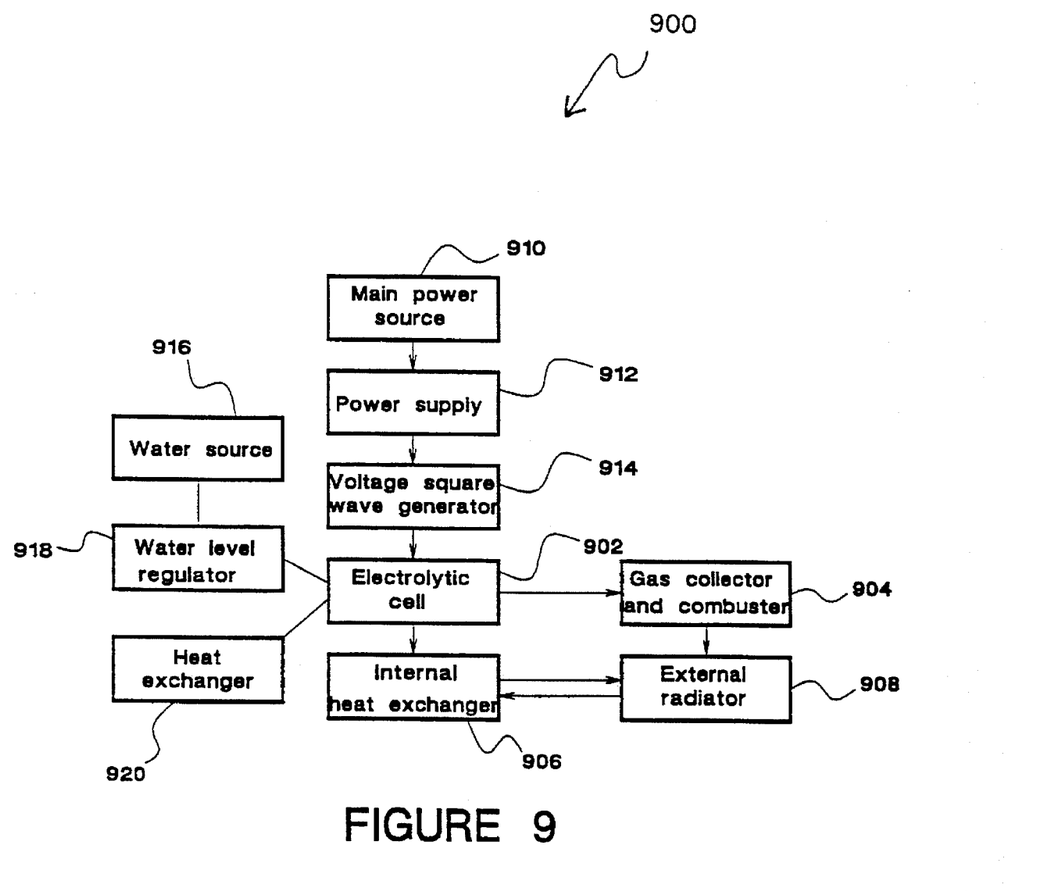
FIG. 9 is a block diagram of a heat pump heater system.

Reference is now made to FIG. 9 wherein a block diagram of an excess energy heat pump heating system 900 is seen. In this case, system 900 is a more efficient heating system than a purely electrical heating system, deriving an additional amount of (excess) thermal energy from an environment which is physically and thermally isolated from the space being heated. System 900 comprises an embodiment of the present invention identified as electrolytic cell 902, a gas collector and combustor 904, an internal heat exchanger 906, an external radiator 908, a connection to a electrical power main 910, a power supply 912, a square wave generator 914, a source of water 916, a water level regulator 918 and a heat exchanger 920.

In this embodiment, two sources for thermal heating are used. Electrolytic cell 902 generates both combustible gases (hydrogen and oxygen) and high temperature water in the vicinity of the cell cathode. The sum of the thermal energy derived from gas combustion in combustor 904 and from heat exchange through external radiator 908 is greater than the power received from main 910. In other words, the power supplied from the main power source 910 through power supply 912 and square wave generator 914 is coupled with the energy received by cell 902 from heat exchanger 920 to produce useful heating; the energy of which is greater than the energy received from main 910.

The water level in cell 902 is maintained at an operational level by adding water from source 916 regulated by regulator 918. Heat exchanger 902 is used to absorb and transport thermal energy from the space physically and thermally isolated from the space being heated. For example, if system 900 was heating a building, heat exchanger 920 may draw heat from the environment outside the building.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by Letters Patent is:

1. An energy generation apparatus comprising:
   an electrolytic cell having at least one anode, at least one cathode and an electrolyte comprising hydrogen adapted to be interposed between said at least one anode and said at least one cathode, said at least one cathode including a surface for communication with said electrolyte;
   means for applying pulsed electrical voltage between said at least one anode and said at least one cathode;
   means for collecting hydrogen gas emitted from said electrolytic cell and extracting energy through oxidation of said hydrogen gas;
   a housing comprising at least one thermal conducting side exposed to a source of thermal energy externally disposed to said housing, said electrolytic cell disposed in said housing and said at least one anode being in thermal communication with said at least one thermal conducting side, said at least one anode comprising means for catalytically dissociating the electrolyte into a plurality of ionic products;
   means for reducing voltage barrier potential of said electrolyte communicating surface; and
   means for reducing electrical resistance between said at least one anode and said at least one cathode.

2. An apparatus according to claim 1, wherein said at least one anode comprises at least one element selected from a group consisting of nickel, platinum, platinum-nickel alloys, stainless steel coated with platinum, iron, palladium, noble metals, stainless steel coated with nickel, rhenium, tungsten, and alloys thereof.

3. An apparatus according to claim 1, wherein said at least one anode comprises a stainless steel plate coated with at least one element from nickel, platinum, and alloys thereof.

4. An apparatus according to claim 3, wherein said at least one element is of a thickness of about 1000 angstroms.

5. An apparatus according to claim 3, wherein said stainless steel plate is of a thickness of about 0.2 mm.

6. An apparatus according to claim 1, wherein said at least one cathode is selected from a group consisting of Ni, Fe, Pd, Pt, and Ir.

7. A apparatus according to claim 1, wherein said electrolytic cell further comprises a container for containing said electrolyte, said electrolyte further comprising a hydroxide, CsOH in water, or at least one metallic ion selected from Cs, Rb, Na and K.

8. An apparatus according to claim 1, wherein said at least one thermal conducting side and said at least one anode are of one material and construction.

9. An apparatus according to claim 1, wherein said means for reducing electrical resistance between said at least one cathode and said at least one anode comprises ion permeable mesh of dielectric material fiber, or ion permeable membrane with low thermal conductivity disposed within said electrolyte and interposed between said at least one cathode and said at least one anode.

10. A apparatus according to claim 9, wherein said dielectric material fiber comprises $SiO_2$ fibers.

11. An apparatus according to claim 1, further comprising means for continuously replacing said electrolyte for maintaining a chosen level of electrolyte within said electrolytic cell.

12. An apparatus according to claim 1, further comprising a cell for converting hydrogen gas to electrical energy where electricity for said source of pulsed electrical voltage is partially supplied from the hydrogen gas output of said electrolytic cell.

13. An apparatus according to claim 12, wherein said hydrogen gas electrical energy converter comprises a fuel cell.

14. An apparatus according to claim 12, wherein said hydrogen gas electrical energy converter comprises a hydrogen gas oxidizer.

15. An apparatus according to claim 1, further comprising a means for removing heat energy from said at least one cathode.

16. An apparatus according to claim 1, further comprising an ion permeable membrane interposed between said at least one anode and said at least one cathode to reduce convective and other retrograde heat flow from said at least one cathode to said at least one anode.

17. An apparatus according to claim 1, further comprising $SiO_2$ fibers disposed between said at least one anode and said at least one cathode for providing a thermal separation.

18. An apparatus according to claim 1, further comprising an impeller to control fluid movement.

19. An apparatus according to claim 1, further comprising a means for supplying an electromagnetic field to said electrolytic cell.

20. An apparatus according to claim 1, wherein the means for applying pulsed electrical voltage applies voltage between about 1.29 and 1.9 volts.

21. An apparatus according to claim 1, wherein said at least one anode and said at least one cathode are spaced apart at least about 100 microns.

22. An apparatus according to claim 1, further comprising an external cell operating electrical pulse power source wherein pulse source frequency harmonics are approximately of a frequency of resonant frequency of surface plasmons of said at least one anode represented by high frequency harmonics of electromagnetic signal in megahertz wave band.

23. An apparatus according to claim 1, wherein said at least one anode comprises electrical conductors for supplying electrical power to said at least one cathode.

24. An apparatus according to claim 1, wherein said electrolyte includes an upper surface and said at least one cathode comprises a cathode having corrugations and including a multiplicity of sloping grooves which aid in the capture of hydrogen bubbles rising toward the upper surface of the electrolyte.

25. An apparatus according to claim 1, wherein said electrolyte includes an upper surface and said at least one anode comprises corrugations including a multiplicity of sloping grooves which aid in capturing oxygen and other gaseous bubbles rising toward the upper surface of the electrolyte, each of said grooves comprising an electrically insulated surface to reduce likelihood of recombination of the gaseous bubbles prior to capture.

26. An apparatus according to claim 1, wherein said at least one anode is adapted to be in thermal communication with an environment surrounding the electrolytic cell.

27. An apparatus according to claim 26, wherein said at least one anode is adapted to be in thermal communication with an environment surrounding the electrolytic cell by means of a water-jacket through which a liquid heat exchange is made with said at least one node.

28. An apparatus according to claim 1, wherein said at least one anode and said at least one cathode have a specific frequency of chemical bond agitation and said source of pulsed electrical voltage includes means for generating a frequency which corresponds to said chemical bond agitation.

29. An apparatus according to claim 1, wherein said at least one anode having a surface comprises a stainless steel plate coated with a layer of material selected from a group of metals consisting of Nickel and Platinum single crystals with crystallographic orientation <111> normal to the anode surface.

30. An apparatus according to claim 1, wherein said at least one anode having a surface comprises a stainless steel plate coated with a layer of material selected from a group of metals consisting of Ni, Pd, Au, Pt, Ir, Rh, and Re single crystals with crystallographic orientation <111> normal to the anode surface.

* * * * *

UNITED STATES PATENT AND TRADEMARK OFFICE
CERTIFICATE OF CORRECTION

PATENT NO. : 5,632,870
DATED : May 27, 1997
INVENTOR(S) : Kucherov

It is certified that error appears in the above-identified patent and that said Letters Patent is hereby corrected as shown below:

Column 11, line 37, after "efficiency of the " insert --operation of cell 10,--.

Column 11, line 38, delete "operation".

Column 13, line 38, insert "the" after --310,-- (first Occurrence)

Column 13, line 39, delete --the--.

Column 14, line 2, after "dependent" insert --upon--.

Column 14, line 3, delete "upon".

Signed and Sealed this

Tenth Day of March, 1998

Attest:

BRUCE LEHMAN

*Attesting Officer*  *Commissioner of Patents and Trademarks*